Dec. 8, 1970  L. G. McGILL  3,545,272
LIQUID LEVEL WARNING DEVICE
Filed April 25, 1969

INVENTOR
LANDON G. McGILL
BY Hyatt Dowell &
Hyatt Dowell, Jr.
ATTORNEYS

United States Patent Office 3,545,272
Patented Dec. 8, 1970

3,545,272
LIQUID LEVEL WARNING DEVICE
Landon G. McGill, P.O. Box 127,
St. Pauls, N.C. 28384
Filed Apr. 25, 1969, Ser. No. 819,326
Int. Cl. G01f 23/10
U.S. Cl. 73—311
5 Claims

ABSTRACT OF THE DISCLOSURE

Apparatus located within a tank or container and having a buoyant portion swingably mounted in a predetermined position within such container. The buoyant portion includes switch means for actuating an indicator when the liquid within the container reaches a predetermined level.

BACKGROUND OF THE INVENTION

Field of the invention

This invention relates generally to signaling devices of various kinds and relates particularly to apparatus located within a liquid-containing tank and adapted to energize a signal when the liquid within the tank falls to a predetermined level.

Description of the prior art

Heretofore many devices have been provided for measuring the amount of liquid within a container, including various types of floats which remain on the surface of the liquid at all times and either give a continuous reading of the amount of liquid within the tank, or which are supposed to energize a signal when the liquid reaches a predetermined level. However, most of these devices have been merely suspended from the top of the tank, have lacked adjustability to indicate any desired level of liquid, have been complicated and expensive to manufacture and maintain, and for other reasons have failed to consistently produce the desired results.

SUMMARY OF THE INVENTION

The present invention includes a generally hollow buoyant member having a pair of electrical contacts in one end of the same and with a ball of mercury or other current-carrying material movably mounted therein. The buoyant member is connected to a flexible carrier line which extends downwardly to a weight and then upwardly through an opening within the tank. The electrical contacts are connected to a source of supply either through the carrier line or through supplementary electrical lines. The distance between the buoyant member and the weight is adjustable so that normally when the tank is substantially filled the buoyant member will be disposed generally along a vertical axis and when the liquid falls to a predetermined level the buoyant member will be disposed at a slight downward angle relative to the horizontal plane so that the ball will roll by gravity into engagement with the electrical contacts to complete a circuit to an alarm or other indicator.

It is an object of the invention to provide a relatively simple, reliable liquid level warning device which can be adjusted quickly and easily and which can be applied to existing tanks in a minimum of time and with little or no modification of the tank being necessary.

Another object of the invention is to provide a liquid level warning device for insertion within a tank and having an easily adjustable buoyant member with electrical contacts which are closed to energize a signal when the liquid within the tank reaches a predeterminel level.

A further object of the invention is to provide a liquid level warning device for application to a conventional tank and having a plurality of buoyant members each of which is connected to an independent signal for indicating various levels of the liquid within the tank.

DESCRIPTION OF THE PREFERRED EMBODIMENTS

Figure 1:
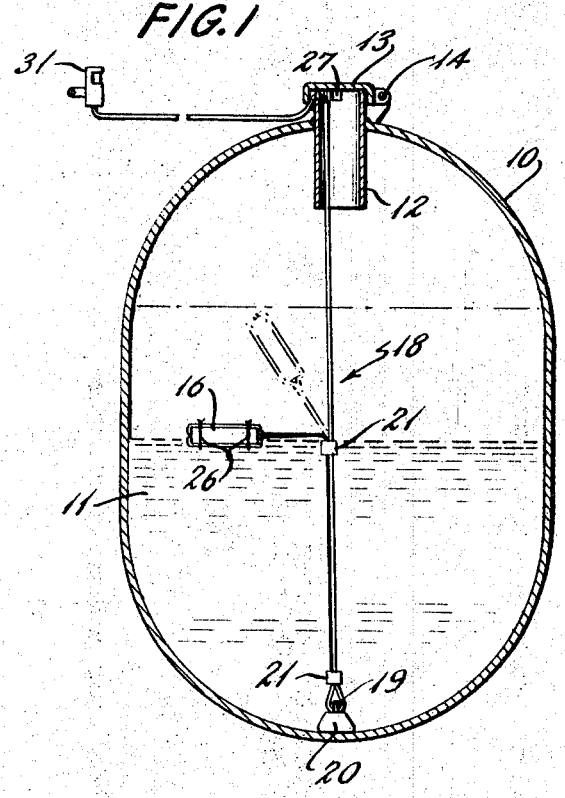
FIG. 1 is a vertical section of a tank illustrating one application of the invention.

With continued reference to the drawing, a tank or container 10 is provided and such tank is adapted to contain a liquid 11 such as fuel oil or the like. The tank includes a filling spout or nozzle 12 having a cap 13 on its upper exposed end to prevent the entrance of debris into the tank. The cap 13 and spout 12 may be provided with cooperating screw threads, or as illustrated the cap 13 can be mounted by a pivot 14 on the spout 12. Normally the tank 10 is provided with an outlet line and a drain line (not shown) for removing liquid therefrom.

In order to determine the amount of liquid within a tank, it has been common practice to remove the cap 13 from the spout and insert a graduated dip stick through the spout to the bottom of the tank. When the dip stick is withdrawn, the liquid level can be directly read on the graduations of the dip stick.

The liquid level warning device of the present invention has been provided to eliminate the need of a dip stick and to automatically indicate when the liquid within the tank has reached a predetermined level. The device includes an elongated generally cylindrical hollow bulb or buoyant member 16 having a ball 17 sealed therein. The ball 17 may be a globule of mercury or a round metal ball such as steel or copper shot. The ball is of a diameter smaller than the interior of the bulb 16 so that it can roll freely from one end to the other.

The bulb 16 is connected generally along its longitudinal axis to a flexible carrier line 18 and such carrier line extends downwardly through an eye 19 of a weight 20 and then is bent back on itself and extends upwardly through the spout 12 to the exterior of the tank. The portions of the carrier line located in side-by-side relation may be connected together by one or more bands or straps 21. Preferably the upper strap is spaced from the weight 20 a distance corresponding substantially to the desired liquid level and the carrier line 18 extends a short distance beyond such band. It is noted that the bands 21 are adjustable toward and from the weight 20 and along the carrier line 18.

Figure 2:
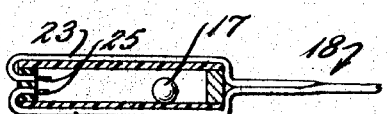
FIG. 2 is an enlarged section of the buoyant member.
Figure 3:
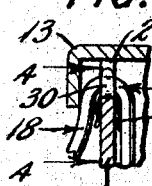
FIG. 3 is an enlarged section of the tank outlet illustrating the mounting for the carrier of the buoyant member.
Figure 4:
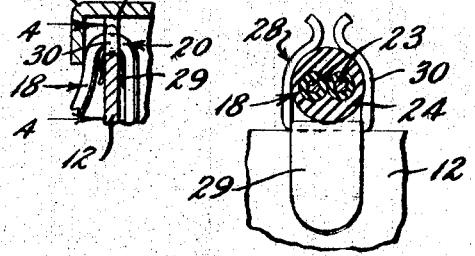
FIG. 4 is a section on the line 4—4 of FIG. 3.

As illustrated in FIGS. 1 and 2, the carrier line 18 may include a pair of insulated electrical conductors 23 which may be fused together or may be imbedded within an insulated covering 24 and such conductors may be disposed on opposite sides of the bulb 16. The free end of each of the conductors is stripped of its insulating material and inserted within the bulb 16 to form a pair of electrical contacts 25 located in a position to be engaged by the ball 17 when such ball gravitates to that end of the bulb. The electrical conductors 23 are connected to the bulb 16 in any desired manner, as by an adhesive or, as illustrated, by a cord 26. If desired the carrier line 18 and electrical conductors 23 may be formed as an integral unit or may be formed as separate units.

At the upper end of the spout 12 one or more notches or recesses 27 are provided and in order to prevent the insulated conductors 23 from being cut by the sharp edge of the spout, a clip 28 is provided having a pair of flexible downwardly extending legs 29 adapted to frictionally engage the inner and outer surfaces of the spout 12 and a pair of upwardly extending legs 30 adapted to receive and frictionally engage the carrier line 18 and the insulated conductors 23. From the clip 28 the insulated conductors extend downwardly under the cap 13 to the exterior and are connected to an indicator or signal 31 located in any convenient place.

In the operation of this modifictaion the carrier line 18 is adjusted relative to the weight 20 after which the bands or straps 21 are applied to the carrier line 18. The device is then inserted into the tank through the spout 12 and the weight 20 permitted to sink to the bottom of the tank. Thereafter the clip 28 is applied to the spout and the carrier line is attached thereto so that the device remains within the tank. If the liquid level within the tank is substantially above the upper band 21, the bulb 16 will be disposed below the liquid level and with the longitudinal axis disposed generally vertically. As the liquid within the tank is used, the liquid level will drop until the bulb 16 has its longitudinal axis disposed generally horizontal or slightly downwardly inclined at which time the ball 17 will gravitate into engagement with the contacts 25 and complete an electrical circuit. The circuit will activate the indicator or signal 31 to apprize the owner of the tank that the contents need replenishing. When additional liquid is introduced into the tank, the liquid level will rise so that the buoyant bulb again will assume a position in which the longitudinal axis is substantially vertical and the electrical circuit will be broken.

Figure 5:
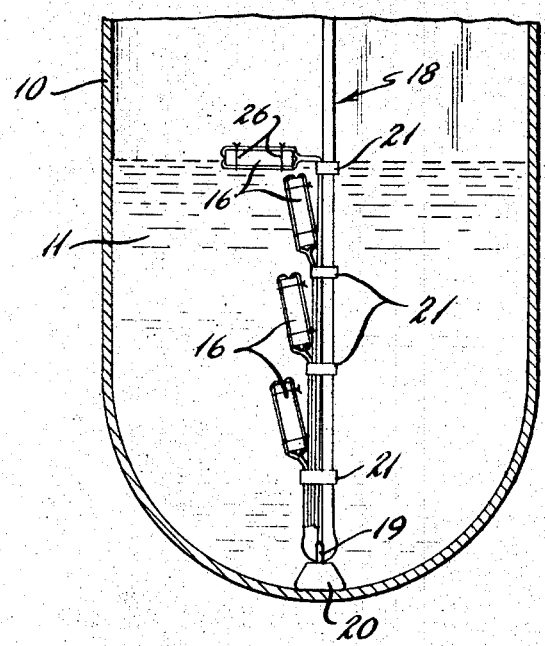
FIG. 5 is a fragmentary section similar to FIG. 1 of a modified form of the invention.
Figure 6:
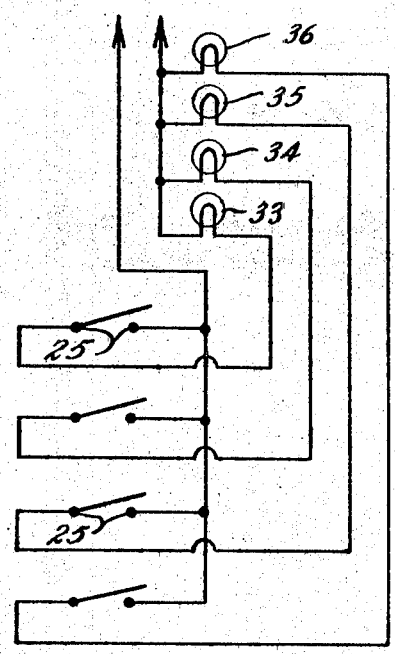
FIG. 6 is a schematic of the wiring diagram of the present invention.

With reference to FIGS. 5 and 6, a modified form of the invention is disclosed in which a plurality of bulbs 16 are mounted on the carrier line 18 by bands or straps 21 and with such bulbs being vertically spaced from each other and from the weight 20. In this construction the bulbs 16 are independently operable and each of such bulbs is connected to a separate indicator or signal such as a lamp or the like. Preferably the lamps are colored different colors to indicate different liquid levels within the tank. As an example, the upper bulb 16 may light a green lamp 33 indicating that the liquid level has reached a point substantially midway of the tank and that approximately half a tank of liquid is left. The second bulb may light a blue lamp 34 indicating that the contents remaining within the tank are somewhat less than half of the total capacity. The third bulb may be connected to a yellow lamp 35 indicating that the depletion of liquid is becoming serious, and the fourth bulb may be connected to a red lamp 36 indicating that the tank is substantially empty and should be replenished at once.

In the operation of this modification, each of the bulbs is mounted in a predetermined position by a band 21 so that when the liquid level falls the bulbs will sequentially operate a series of indicators or signals 31.

What is claimed is:

1. A liquid level warning device for insertion within a liquid-containing tank, said device comprising an elongated generally cylndrical hollow buoyant member, a carrier line connected to said buoyant member substantially along the longitudinal axis thereof, an electricity conducting ball means freely carried within said buoyant member, a pair of electrical conductors disposed within said carrier line and connected at one end to the end of said buoyant member remote from said carrier line with a pair of contacts extending into said buoyant member in a position to be engaged by said ball means, signal means connected to the opposite end of said electrical conductors, said electrical conductors being supplied with electrical energy, a weight adapted to rest on the bottom of said tank and being adjustably connected to said carrier line, said carrier line extending from the top of said tank to said weight and back to said buoyant member, and means for adjusting the distance between said buoyant member and said weight to regulate the position of said buoyant member within the tank, so that said device is placed within a liquid containing tank until the weight rests on the bottom of said tank so that the buoyant member will be disposed with its longitudinal axis in a generally vertical plane until the liquid level drops to the level of the buoyant member, whereupon the longitudinal axis of the buoyant member will be substantially horizontal and the ball means will gravitate to the electrical contacts to complete an electrical circuit and energize said signal means.

2. The structure of claim 1 including a plurality of independently operable buoyant members each connected to a separate signal means and indicating different liquid levels within said tank.

3. The structure of claim 2 in which each of said buoyant members is connected to a lamp of a different color.

4. The structure of claim 1 including clip means for mounting said carrier line on said tank.

5. A liquid level warning device for insertion within a liquid containing tank, said device comprising at least one elongated generally cylndrical hollow buoyant member, an electricity conducting ball means freely movably mounted within said buoyant member, a carrier line connected to said buoyant member substantially along the longitudinal axis thereof, electrical conductors imbedded within said carrier line, said conductors connected at one end to the end of said buoyant member remote from said carrier line with a pair of contacts extending into said buoyant member in a position to be engaged by said ball means, signal means connected to the opposite end of said electrical conductors, a weight adapted to rest on the bottom of said tank, said weight being adjustably connected to said carrier line, said carrier line extending from the top of said tank to said weight and back to said buoyant member with portions of said carrier line being disposed in side-by-side relation to each other, at least one strap means connecting said portions together in fixed adjusted position to regulate the position of said buoyant member within the tank, and means for connecting said carrier line to said tank in a manner that the end of the carrier line extends outwardly thereof, so that said device is placed within the liquid-containing tank until the weight rests on the bottom thereof and the buoyant member is disposed with its longitudinal axis in a generally vertical plane when the liquid level is substantially above said buoyant member, and will be disposed with its longitudinal axis in a substantially horizontal plane when the liquid level drops to the level of the buoyant member and the ball means will gravitate to the electrical contacts to complete an electrical circuit and energize said signal means.

References Cited

UNITED STATES PATENTS

| 532,868 | 1/1895 | Bull | 340—244D |
| 2,600,659 | 6/1952 | Koch | 340—244D |
| 2,796,455 | 6/1957 | Jones | 174—72A |
| 3,259,714 | 7/1966 | Coeur | 200—84.2 |
| 3,440,375 | 4/1969 | Wood | 200—84.2 |

FOREIGN PATENTS

| 221,019 | 7/1957 | Australia | 200—84.2 |
| 1,357,360 | 5/1964 | France | 73—308 |

LOUIS R. PRINCE, Primary Examiner

D. M. YASICH, Assistant Examiner

U.S. Cl. X.R.

73—313; 340—244